United States Patent
Zhang et al.

(10) Patent No.: US 11,288,098 B1
(45) Date of Patent: Mar. 29, 2022

(54) JOB SHOP SCHEDULING METHOD WITH BUFFER CONSTRAINTS BASED ON IMPROVED GENETIC ALGORITHM

(71) Applicant: Southwest Jiaotong University, Chengdu (CN)

(72) Inventors: Jian Zhang, Chengdu (CN); Guofu Ding, Chengdu (CN); Lei Jiang, Chengdu (CN); Huan Luo, Chengdu (CN); Mingzhu Hu, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 17/534,943

(22) Filed: Nov. 24, 2021

(30) Foreign Application Priority Data

Nov. 27, 2020 (CN) .......................... 202011352797.3

(51) Int. Cl.
*G06F 9/50* (2006.01)
*G06N 5/00* (2006.01)

(52) U.S. Cl.
CPC ........... *G06F 9/5027* (2013.01); *G06N 5/003* (2013.01)

(58) Field of Classification Search
None
See application file for complete search history.

(56) References Cited

U.S. PATENT DOCUMENTS

| | | | | |
|---|---|---|---|---|
| 9,317,626 | B2* | 4/2016 | Chan | G06F 30/00 |
| 11,107,024 | B2* | 8/2021 | Koski | G06Q 10/06316 |
| 2011/0224816 | A1* | 9/2011 | Pereira | G06Q 10/06 700/100 |
| 2012/0123980 | A1* | 5/2012 | Bhandari | G06N 3/126 706/13 |
| 2013/0139170 | A1* | 5/2013 | Prabhakar | G06F 9/4893 718/104 |
| 2016/0179081 | A1* | 6/2016 | Sun | G05B 19/4069 700/97 |
| 2018/0356803 | A1* | 12/2018 | Liu | G05B 19/41865 |

OTHER PUBLICATIONS

Cebi et al.; "Job Shop Scheduling Problem and Solution Algorithms: A Review"; 11th ICCNT 2020; Jul. 3, 2020; IEEE; (Cebi_2020.pdf; pp. 1-7) (Year: 2020).*

(Continued)

*Primary Examiner* — Hiren P Patel
(74) *Attorney, Agent, or Firm* — WPAT, PC

(57) ABSTRACT

A job shop scheduling method with buffer constraints based on an improved genetic algorithm (IGA) is provided, which specifically includes the following steps: firstly establishing a job shop scheduling mathematical model with buffer constraints; then performing an optimization solution of the improved genetic algorithm, and adopting a job shop scheduling process and a double-layer coding of machines to design a reasonable process adjustment method for decoding; using adaptive crossover mutation probability combined with improved cross operator to improve the algorithm and optimize a solution model. The solution with a higher precision can be obtained under the same buffer capacity, and the efficiency and convergence ability of the algorithm are improved.

3 Claims, 4 Drawing Sheets

(56) References Cited

OTHER PUBLICATIONS

Dao et al.; "An Improved genetic algorithm for multidimensional optimization of precedence-constrained production planning and scheduling" University of South Australia; Jan. 9, 2017; (Dao_2017.pdf; pp. 143-159) (Year: 2017).*

Hao et al; "Approach for Dynamic Job Shop Scheduling Based on GASA"; Fourth International Conference on Natural Computation; IEEE 2008; (Hao_2008.pdf; pp. 561-565) (Year: 2008).*

Hongyan et al; "Research on Job-Shop Scheduling Problem Based on Self-Adaptation Genetic Algorithm"; IEEE 2010; (Hongyan_2010.pdf; pp. 940-943) (Year: 2010).*

Hu et al; "An Improved Genetic Algorithm for Flexible Job Shop Scheduling Problem with Buffer Constraints"; Proceedings of the 26th International Conference on Automation & Computing, Sep. 4, 2021; (Hu_2021.pdf; pp. 1-7) (Year: 2021).*

Lacomme et al.; "Resolution of a Job-Shop Problem with a Single Transport Robot and Buffer Facilities"; IEEE 2006; (Lacomme_2006.pdf; pp. 1-6) (Year: 2006).*

JianLinFu et al; "An Order Inserting Predictive-reactive Batch-splitting Scheduling Method"; Proceedings of the 25th International Conference on Automation & Computing, Lancaster University, Lancaster UK, Sep. 5-7, 2019; (LinFu_2019.pdf; pp. 1-8) (Year: 2019).*

Xianzou et al; "An Improved Genetic Algorithm for Dual-Resource Constrained Flexible Job Shop Scheduling"; IEEE 2011; (Xianzhou_2011.pdf; pp. 42-45) (Year: 2011).*

Liu et al.; "The Fuzzy Job-Shop Scheduling Based on Improved Genetic Algorithm"; Proceedings of the Sixth International Conference on Machine Learning and Cybernetics, Hong Kong, Aug. 19-22, 2007; IEEE 2007; (Liu_2007.pdf; pp. 3144-3147) (Year: 2007).*

* cited by examiner

JOB SHOP SCHEDULING METHOD WITH BUFFER CONSTRAINTS BASED ON IMPROVED GENETIC ALGORITHM

TECHNICAL FIELD

The invention belongs to the field of job shop scheduling, and particularly relates to a job shop scheduling method with buffer constraints based on an Improved Genetic Algorithm (IGA).

BACKGROUND

Job shop scheduling is one of the most common scheduling problems, and many scholars have conducted research intensively and extensively in this field for a long time. At present, when the scheduling model is constructed, it is assumed that buffer capacity of the machine is infinite, ignoring the impact of buffer capacity on job shop scheduling. In the actual production process, this assumption leads to the inapplicability of the mathematical models of many job shops. The buffer between machines can accommodate product parts after processing the equipment unit or supply them to the next equipment unit according to the following operation, so the buffer in production is very important to alleviate the sudden changes in the production line. However, in the pursuit of "zero inventory" or even "zero buffer" to reduce the lean production of WIP (Work In Process), the buffer capacity is extremely limited. Obviously, the job shop model and solution taking buffer constraints into consideration is a favourable means to solve these practical production problems.

At present, there is little research on the solution of job shop scheduling problem with buffer constraints, and the solution is focused on the coarse-grained workpiece level. At one time, because the complexity of the problem surpasses the conventional job-shop scheduling problem, heuristic algorithm is basically used to solve the problem.

SUMMARY

In order to overcome the shortcomings of the job shop scheduling solution with buffer constraints in the prior art, the invention provides a job shop scheduling method with buffer constraints based on IGA.

The job shop scheduling method with buffer constraints based on IGA of the invention specifically includes the following steps:

step 1, establishing a job shop scheduling mathematical model with buffer constraints;

the step 1 specifically includes: assuming that there are n independent and non-preemptive jobs that must be processed on m machines, and establishing an objective mathematical model by expressed as the following formula (1) by minimizing a completion time as an optimization objective:

$$\min C = \min\left(\max_{1 \leq j \leq n} (C_j)\right) \quad (1)$$

where C denotes a maximum completion time of jobs, $C_j$ denotes a completion time of job j, j denotes a job index, and n denotes number of the jobs;

where constraint conditions are expressed as follows:

$$P_{ijk} > 0, i=1,2,\ldots,p_j; j=1,2,\ldots,n; k=1,2,\ldots,m \quad (2)$$

where formula (2) indicates that a non-negative constrain on a processing time of each operation of the job is not negatively constrained; $P_{ijk}$ is the processing time of an i-th operation of the job j on a machine $M_k$, m denotes the number of machines, k denotes a machine index, M denotes a machine set, $M_k$ denotes a machine k, $M_k \in M$, $P_j$ denotes an operation number of the job j, and i denotes an operation index of the job j on a designated processing route;

$$\sum_{k=1}^{m} h_{ijk} C_{ijk} \leq \sum_{k=1}^{m} h_{(i+1)jk} S_{(i+1)jk}; \quad (3)$$

$$i = 1, 2, \ldots, p_i; j = 1, 2, \ldots, n$$

where formula (3) indicates that there is no priority relationship between operations of different jobs, and the same job meets process relations between operations; $h_{ijk}$ denotes whether the i-th operation of the job j is on the machine $M_k$; if so, $h_{ijk}=1$, otherwise, $h_{ijk}=0$; $S_{ijk}$ denotes a processing starting time of the i-th operation of the job j on the machine $M_k$;

$$\sum_{k=1}^{m} h_{ijk} = 1, i = 1, 2, \ldots, p_i; j = 1, 2, \ldots, n \quad (4)$$

where formula (4) indicates that the job can only be processed on one machine at one time;

$$\sum_{j=1}^{n} h_{ijk} \leq 1, i = 1, 2, \ldots, p_i; k = 1, 2, \ldots, m \quad (5)$$

where formula (5) indicates that one machine can only process one job at one time;

$$\sum_{k=1}^{m} \beta_{ijk} h_{ijk} (S_{ijk} + P_{ijk} + B_{ijk} + ST_{ijk}) = \sum_{k=1}^{m} h_{(i+1)jk} S_{(i+1)jk}, \quad (6)$$

$$i = 1, 2, \ldots, p_i - 1; j = 1, 2, \ldots, n$$

where equation (6) indicates a constraint of limited buffer, excluding a last operation in a processing route of each job, and the job is considered as leaving a production system and no longer occupying resources when the last operation of the job is completed; after the i-th operation $O_{ij}$ of the job j is completed, a departure time of the job j in a corresponding buffer of the machine is the same as a starting time of a next operation $O_{i+1,j}$ of the job j; $\beta_{ijk}$ denotes whether the $O_{ij}$ needs to enter the corresponding buffer after being completed on the machine $M_k$, if so, $\beta_{ijk}=1$, otherwise, $\beta_{ijk}=0$; $\beta_{ijk}$ denotes a blocking time of the job j on the machine $M_k$ after the i-th operation is completed, and $ST_{ijk}$ denotes a storage time of the job j in the machine after the i-th operation is completed;

$$\sum_{k=1}^{m} \alpha_k h_{ijk} (S_{ijk} + P_{ijk} + B_{ijk}) = \sum_{k=1}^{m} h_{(i+1)jk} S_{(i+1)jk}, \quad (7)$$

$$i = 1, 2, \ldots, p_{i_1}; j = 1, 2, \ldots, n$$

where equation (7) indicates a blocking constraint excluding the last operation in the processing route of each job, and the machine is blocked if a buffer capacity is insufficient; after a completion of $O_{ij}$, the machine $M_k$ is possibly blocked because the corresponding buffer is full; $a_k$ denotes whether the buffer capacity corresponding to the machine $M_k$ is sufficient and if the buffer capacity is insufficient, $\alpha_k=1$, otherwise, $\alpha_k=0$; and step 2, performing an optimization solution of the improved genetic algorithm, which specifically includes the following sub-steps:

sub-step (1), parameter initialization, which specifically includes: setting a population size PopSize, a generation gap OPT, crossover probabilities $P_{c1}$ and $P_{c2}$, mutation probabilities $P_{m1}$ and $P_{m2}$, and maximum iteration times Gmax;

sub-step (2), population initialization, which specifically includes: using real-number coding to randomly generate an operation sequence to thereby generate an initial population Initial_Pop;

sub-step (3), population fitness function value calculation, which specifically includes: calculating objective function values according to the formula (1) and then converting the objective function values into fitness values;

sub-step (4), selection operation, which specifically includes: selecting individuals of the population according to fitness values and the generation gap OPT by means of a roulette;

sub-step (5), crossover operation, which specifically includes: combining an improved variety crossover and an integer crossover according to the population after the selection operation, and determining whether crossover is needed according to the fitness values of the individuals and the following formula (8), where the improved variety crossover refers to the crossover operation between elite individuals of the population and some individuals with poor fitness values after the selection operation; after the selection operation, performing a shuffle crossover on the rest of the individuals except for individuals undergoing the improved variety crossover;

$$P_c = \begin{cases} P_{C1} - \dfrac{(P_{c1}-P_{c2})(f'-f_{avg})}{f_{max}-f_{avg}}, & f' \geq f_{avg} \\ P_{C1}, & f' < f_{avg} \end{cases} \quad (8)$$

where, $f_{max}$ denotes a maximum fitness value of the individual in the population, $f_{avg}$ denotes an average fitness value of the population, f' denotes a larger fitness value of two crossed individuals, and $P_{c1}$ and $P_{c2}$ denote maximum and minimum crossover probabilities respectively;

sub-step (6), mutation operation, which specifically includes: adopting a two-point mutation according to the fitness values of the individuals and the following formula (9) to randomly exchange operation positions of two different jobs for mutation;

$$P_m = \begin{cases} P_{m1} - \dfrac{(P_{m1}-P_{m2})(f_{max}-f)}{f_{max}-f_{avg}}, & f \geq f_{avg} \\ P_{m1}, & f < f_{avg} \end{cases} \quad (9)$$

where $P_{m1}$ and $P_{m2}$ denote maximum and minimum mutation probabilities, and f denotes a fitness value of mutated individual;

sub-step (7), population merging, which specifically includes: maintaining top 10% of elite individuals according to fitness values of parents and offsprings by adopting an elite retention strategy, and replacing remaining individuals in parents with individuals after genetic operations; and sub-step (8), judging whether the maximum iteration times is met, where a result is output when the maximum iteration times is met, or returning to the sub-step (2) when the maximum iteration times is not met.

In an embodiment, a decoding operation is required in the sub-step (3), and the specific steps are as follows:

S1, decoding according to the operation sequence, and finding out earliest processing starting time $S_{ijk}$ of currently decoded $O_{ij}$ on the machine $M_k$;

S2, when $O_{ij}$ is first operation of the job j, namely i=1, returning to the S1 to continue decoding the next operation; otherwise, going to S3;

S3, judging according to the processing starting time $S_{ijk}$ of the operation $O_{ij}$ and a completion time $C_{i-1,j,k'}$ of the previous operation $O_{i-1,j}$, if $C_{i-1,j,k'}=S_{ijk}$, going to S4; otherwise going to S5;

S4, updating processing time, buffering time and blocking time of the machine, and judging whether the operation $O_{ij}$ is the last operation of the job; if so, going to S6; otherwise, going to the S1;

S5, judging whether an output buffer corresponding to a machine $M_{k'}$ of the previous operation $O_{i-1,j}$ in a time period $[C_{i-1,j,k'}, S_{ijk}]$ is available; if so, returning to the S4; otherwise going to the S7;

S6, judging whether all the jobs have finished the decoding; if so, ending the decoding operation; otherwise, returning to the S1;

S7, judging whether other job processing has been scheduled on the machine $M_{k'}$ corresponding to the previous operation $O_{i-1,j}$ in the time period $[C_{i-1,j,k'}, S_{ijk}]$ when the buffer is unavailable; if no other job processing has been scheduled, returning to the S4; otherwise going to S8;

S8, finding out a buffer available time moment of the machine $M_{k'}$ in the time period $[C_{i-1,j,k'}, S_{ijk}]$, and judging whether there is other scheduled operation on the machine $M_{k'}$ in a blocking time period from a completion of the previous operation to the buffer available time moment, and the buffer is available in a buffering time period from the buffer available time moment to a beginning of current operation; if there is no other scheduled operations in the blocking time period and the buffer is available in the buffering time period, returning to the S4; otherwise going to S9; and S9, adjusting the previous operation $O_{i-1,j}$ according to conflict points of the time period $[C_{i-1,j,k'}, S_{ijk}]$ until there is no conflict between all decoded operations of the job; otherwise, returning to the S4.

In an embodiment, the S9 specifically includes:

S91, finding out the conflict point of the operation $O_{i-1,j}$ in the blocking time period or the buffering time period of the machine, and adjusting the earliest processing starting time and the completion time of the operation $O_{i-1,j}$ according to the conflict points;

S92, judging a relation between adjusted $C_{i-1,j,k'}$ and the processing starting time $S_{ijk}$ of $O_{ij}$; if $C_{i-1,j,k'}=S_{ijk}$, going to S93; if $C_{i-1,j,k'}<S_{ijk}$, going to S94; if $C_{i-1,j,k'}>S_{ijk}$, going to S95;

S93, judging whether there is a previous operation before the operation $O_{i-1,j}$, and ending the adjusting if there is no previous operation; otherwise, going to S96;

S94, judging whether there is conflict between the operations $O_{ij}$ and $O_{i-1,j'}$, and if there is conflict, returning to the S91 to continuously adjust $O_{i-1,j'}$; otherwise, returning to the S93;

S95, re-adjusting the processing starting time $S_{ijk}$ of the operation $O_{ij}$ according to the adjusted $C_{i-1,j,k}$; and then judging whether there is conflict between the operations $O_{ij}$ and $O_{i-1,j'}$, if there is conflict, returning to the S91 to continuously adjust the operation $O_{i-1,j'}$, otherwise, judging whether there is a decoded succeeding operation in the operation $O_{ij}$, and if there is decoded subsequent operation, going to S97, otherwise returning to the S93;

S96, judging whether there is a conflict between the operations $O_{i-2,j}$ and $O_{i-1,j'}$, and if there is conflict, letting i=i−1 and returning to the S91, otherwise, ending the adjusting; and S97, judging whether there is a conflict between the operation $O_{ij}$ and $O_{i+1,j'}$, and if there is conflict, letting i=i+1 and returning to the S91, otherwise, returning to the S93.

The method has the beneficial technical effects that:

(1) compared with the conventional solving method of the job shop scheduling problem, the job shop scheduling problem with buffer constraints solved by this method is better in line with the actual production situation of discrete manufacturing workshops and the concept of lean production; and (2) the decoding method and process adjustment method designed by this method are different from the conventional job shop solving method, which can solve the more complex job shop scheduling problem with buffer constraints, and adopt the IGA to solve the problem. The genetic algorithm is improved by adopting the adaptive crossover mutation probability and the improved variety crossover operator to improve the efficiency and convergence ability of the algorithm.

DETAILED DESCRIPTION OF EMBODIMENTS

Figure 1:
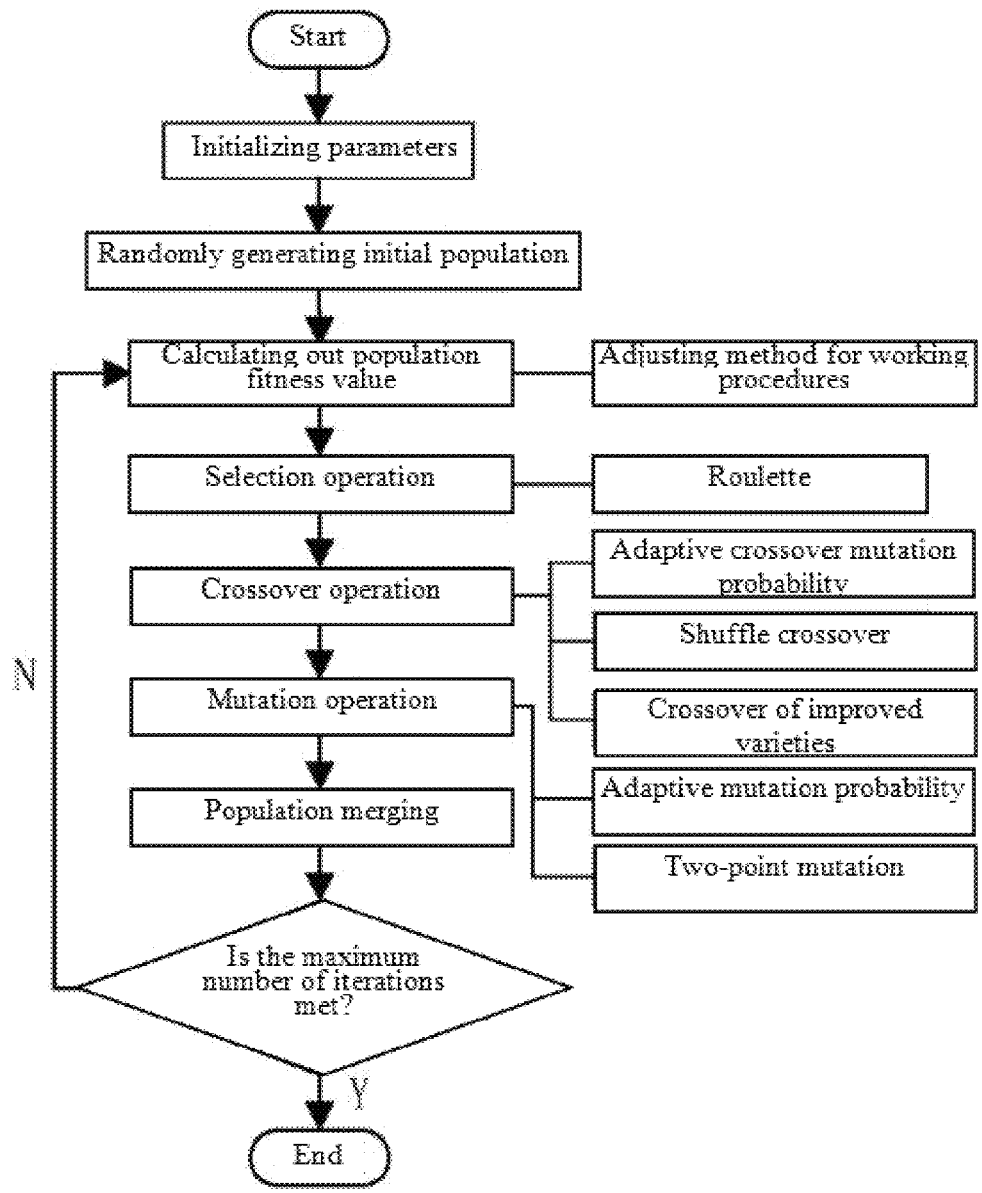
FIG. 1 is a schematic flow chart of IGA.

The invention will be further described in detail with reference to the attached drawings and specific embodiments.

A job shop scheduling method with buffer constraints based on IGA of the invention may specifically include the following steps:

step 1, establishing a job shop scheduling mathematical model with buffer constraints;

specifically, job shop scheduling with buffer constraint can be described as follows: there are n independent and non-preemptive jobs that must be processed on m machines. Based on the buffer capacity, the jobs are optimally allocated and sorted by machines. Usually, the optimization objective is to minimize the completion time. Every operation must be processed on a given processing route, but the processing routes corresponding to different jobs are different. Only one operation of a job can be processed on one machine, and each machine can only process one operation at one time. Once a certain operation of a job starts on the equipment until the processing is completed, it cannot be interrupted. Each machine has a designated buffer capacity, and there is no priority relationship among different one of the jobs, and the job can only be processed on one machine at one time. Compared with processing time, blocking time or storage time, the job transfer time between machines can be neglected. When a certain operation of a job other than the last one is finished on the machine, if the processing machine corresponding to the next operation is idle, the job can enter the next machine for processing; otherwise, when the next machine is in a busy state, it should be judged whether the buffer corresponding to the current machine is available, and if so, the job can be moved into the buffer (the output buffer corresponding to the machine) corresponding to the current machine; otherwise, if the current machine buffer is full, the job will stay on the machine and cause blockage to the machine, hindering the subsequent processing of the job on this machine.

Under the above assumptions, an objective mathematical model is established by minimizing a completion time as an optimization objective:

$$\min C = \min\left(\max_{1 \le j \le n}(C_j)\right) \quad (1)$$

where C denotes a maximum completion time of jobs, $C_j$ denotes a completion time of job j, j denotes a job index, and n denotes number of the jobs;

where constraint conditions are expressed as follows:

$$P_{ijk} > 0, i = 1, 2, \ldots, p_j; j = 1, 2, \ldots, n; k = 1, 2, \ldots, m \quad (2)$$

where formula (2) indicates that a non-negative constrain on a processing time of each operation of the job; $P_{ijk}$ is the processing time of an i-th operation of the job j on a machine $M_k$, m denotes the number of machines, k denotes a machine index, M denotes a machine set, $M_k$ denotes a machine k, $M_k \in M$, $P_j$ denotes an operation number of the job j, and i denotes an operation index of the job j on a designated processing route;

$$\sum_{k=1}^{m} h_{ijk} C_{ijk} \le \sum_{k=1}^{m} h_{(i+1)jk} S_{(i+1)jk}; \quad (3)$$

$$i = 1, 2 \ldots, p_i; j = 1, 2, \ldots, n$$

where formula (3) indicates that there is no priority relationship between operations of different ones of the jobs, and the same job meets processing relations between the operations; $h_{ijk}$ denotes whether the i-th operation of the job j is on the machine $M_k$; if so, $h_{ijk}=1$, otherwise, $h_{ijk}=0$; $S_{ijk}$ denotes a processing starting time of the i-th operation of the job j on the machine $M_k$;

$$\sum_{k=1}^{m} h_{ijk} = 1, i = 1, 2, \ldots, p_i; j = 1, 2, \ldots, n \quad (4)$$

where formula (4) indicates that the job can only be processed on one machine at one time;

$$\sum_{j=1}^{n} h_{ijk} \le 1, i = 1, 2, \ldots, p_i; k = 1, 2, \ldots, m \quad (5)$$

where formula (5) indicates that one machine can only process one job at one time;

$$\sum_{k=1}^{m} \beta_{ijk} h_{ijk} (S_{ijk} + P_{ijk} + B_{ijk} + ST_{ijk}) = \sum_{k=1}^{m} h_{(i+1)jk} S_{(i+1)jk}, \quad (6)$$

$$i = 1, 2, \ldots, p_i - 1; j = 1, 2, \ldots, n$$

where equation (6) indicates a constraint of limited buffer excluding a last operation in a processing route of each job, and the job is considered as leaving a production system and no longer occupying resources when the last operation of the job is completed; after the i-th operation $O_{ij}$ of the job j is completed, a departure time of the job j in a corresponding buffer of the machine is the same as a starting time of a next operation $O_{i+1,j}$ of the job j; $\beta_{ijk}$ denotes whether the $O_{ij}$ needs to enter the corresponding buffer after being completed on the machine $M_k$, if so, $\beta_{ijk}=1$, otherwise, $\beta_{ijk}=0$; $\beta_{ijk}$ denotes a blocking time of the job j on the machine $M_k$ after the i-th operation is completed, and $ST_{ijk}$ denotes a storage time of the job j in the machine after the i-th operation is completed.

$$\sum_{k=1}^{m} \alpha_k h_{ijk} (S_{ijk} + P_{ijk} + B_{ijk}) = \sum_{k=1}^{m} h_{(i+1)jk} S_{(i+1)jk}, \quad (7)$$

$$i = 1, 2, \ldots, p_{i_1}; j = 1, 2, \ldots, n$$

where equation (7) indicates a blocking constraint excluding the last operation in the processing route of each job, and the machine is blocked if a buffer capacity is insufficient; after a completion of $O_{ij}$, the machine $M_k$ is possibly blocked because the corresponding buffer is full; $\alpha_k$ denotes whether the buffer capacity corresponding to the machine $M_k$ is sufficient, and if the buffer capacity is insufficient, $\alpha_k=1$, otherwise, $\alpha_k=0$; and step 2, performing an optimization solution of the improved genetic algorithm.

Heuristic algorithm is a way to figure out the best solution in an acceptable computing time, but it does not necessarily guarantee the feasibility and optimality of the obtained solution, and even in most cases, it is impossible to explain the degree of approximation between the obtained solution and the optimal solution. Heuristic algorithm is used to solve job shop scheduling problem with buffer constraints, which takes the workpiece level as the code, sorts according to the total processing time of each job, and then carries out local search operation based on this sort. This local search based on the workpiece level code is likely to result in local optimization, thus reducing the accuracy of scheduling results. Meta-heuristic algorithm is an improvement of heuristic algorithm, which is the product of combining random algorithm with local search algorithm. The solving process of meta-heuristic algorithm in job shop scheduling problem with buffer constraint is as follows: the problematic code is extended from the workpiece level to the operation level, and the search operation is performed based on the operation sequencing. In this way, the operation sequencing is randomly generated to expand the global search range of the algorithm to avoid local optimization. Genetic algorithm is one of the most widely used meta-heuristic algorithms for solving job-shop scheduling problems, which has good applicability for solving complex polynomial problems and generally can achieve better results.

According to the method, the conventional job shop scheduling process and the double-layer coding of the machine are adopted at first, and in order to ensure the legitimacy of the solution, the gene coding under the buffer constraints needs to be adjusted, so a reasonable process adjustment method is designed for decoding. Although genetic algorithm has good applicability, it also has some shortcomings. For example, under the action of conventional genetic operators, some excellent gene fragments are easily lost, which leads to premature convergence and low search efficiency in the late evolution. The adaptive crossover mutation probability combined with improved cross operator is proposed to improve the algorithm. This adaptive adjustment method makes the algorithm have strong global searching ability in the early stage of evolution. The global searching ability of the algorithm gradually weakens with the evolution, while the local searching ability gradually enhances, which improves the efficiency and applicability of the algorithm.

The flow of IGA is shown in FIG. 1, specifically as follows:

(1), parameters initialization, which specifically includes: setting a population size PopSize, a generation gap OPT, crossover probabilities $P_{c1}$ and $P_{c2}$, mutation probabilities $P_{m1}$ and $P_{m2}$, and maximum iteration times Gmax;

(2), population initialization, which specifically includes: using real-number coding to randomly generate an operation sequence to thereby generate an initial population Initial_Pop;

(3), population fitness function value calculation, which specifically includes: calculating objective function values according to the formula (1) and then converting the objective function values into fitness values;

(4), selection operation, which specifically includes: selecting individuals of the population according to the fitness values and the generation gap OPT by means of a roulette;

(5), crossover operation, which specifically includes: combining an improved variety crossover and an integer crossover according to the population after the selection operation, and determining whether crossover is needed according to fitness values of the individuals and the following formula (8), where the improved variety crossover refers to the crossover operation between elite individuals of the population and some individuals with poor fitness values after the selection operation; after the selection operation, performing a shuffle crossover on the rest of individuals except for individuals undergoing the improved variety crossover;

$$P_c = \begin{cases} P_{C1} - \dfrac{(P_{c1} - P_{c2})(f' - f_{avg})}{f_{max} - f_{avg}}, & f' \geq f_{avg} \\ P_{C1}, & f' < f_{avg} \end{cases} \quad (8)$$

where, $f_{max}$ denotes a maximum fitness value of the individual in the population, $f_{avg}$ denotes an average fitness value of the population, f' denotes a larger fitness value of two crossed individuals, and $P_{c1}$ and $P_{c2}$ denote maximum and minimum crossover probabilities respectively;

(6), mutation operation, which specifically includes: adopting a two-point mutation according to the fitness values of the individuals and the following formula (9) to randomly exchange operation positions of two different jobs for mutation.

$$P_m = \begin{cases} P_{m1} - \dfrac{(P_{m1} - P_{m2})(f_{max} - f)}{f_{max} - f_{avg}}, & f \geq f_{avg} \\ P_{m1}, & f < f_{avg} \end{cases} \quad (9)$$

where, $P_{m1}$ and $P_{m2}$ denote maximum and minimum mutation probabilities respectively, and f denotes a fitness value of mutated individual;

(7), population merging, which specifically includes: maintaining top 10% of elite individuals according to fitness values of parents and offsprings by adopting an elite retention strategy, and replacing remaining individuals in parents with individuals after genetic operations including the selection operation, the crossover operation and the mutation operation; and (8), judging whether the maximum iteration times is met, where a result is output when the maximum iteration times is met, or returning to the step (2) when the maximum iteration times is not met.

Figure 2:
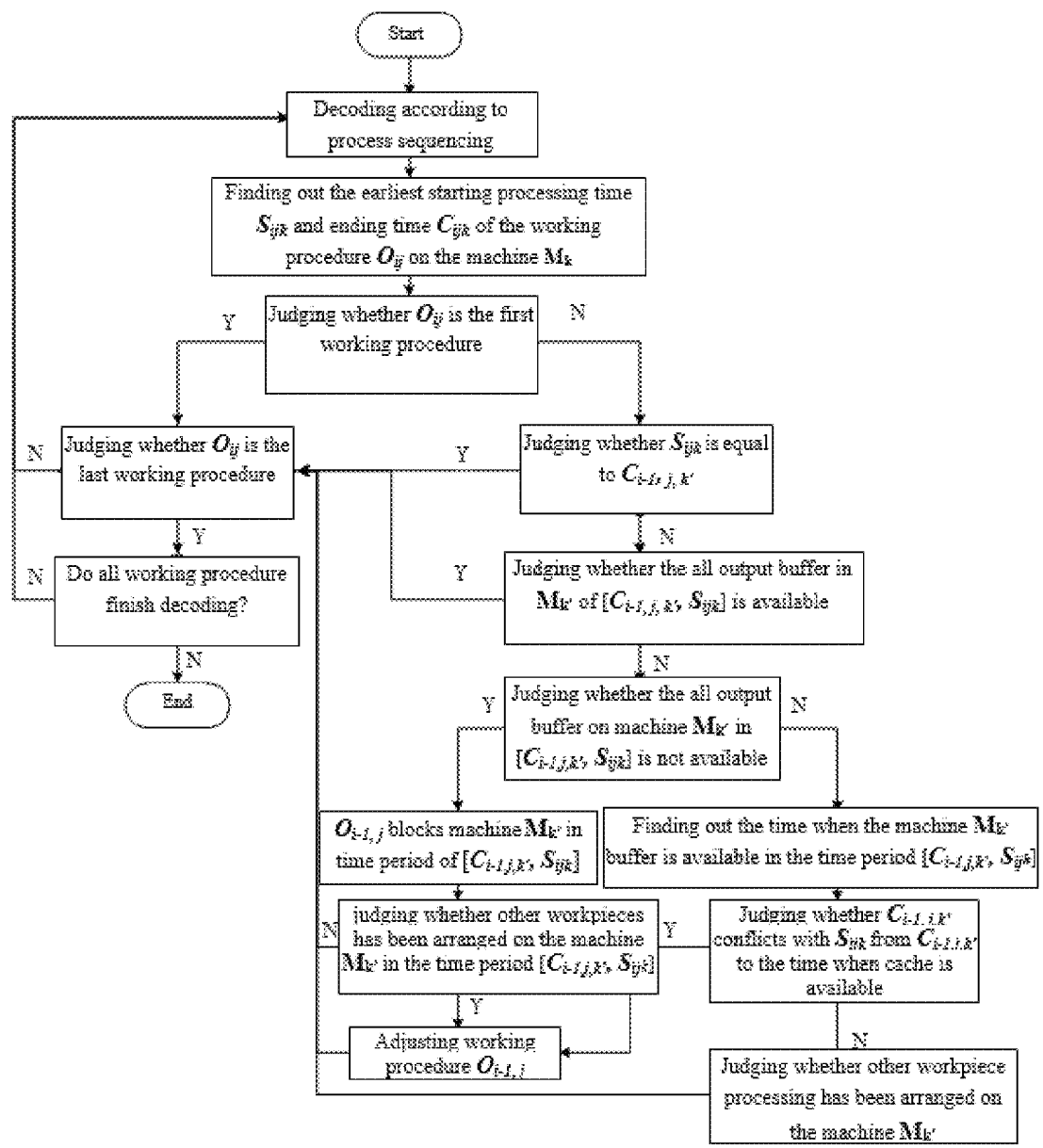
FIG. 2 is a decoding flow chart.

In the step (3) of the IGA, a decoding operation is needed. Aiming at the job shop scheduling problem with output buffer constraints, a complete decoding process is designed based on double-layer coding of operation and machine. The decoding flow chart is shown in FIG. 2, and the specific steps are as follows:

S1, decoding according to the operation sequence, and finding out earliest processing starting time $S_{ijk}$ of currently decoded $O_{ij}$ on the machine $M_k$;

S2, when $O_{ij}$ is first operation of the job j, namely i=1, returning to the S1 to continue decoding the next operation; otherwise, going to S3 (i≠1);

S3, judging according to the processing starting time $S_{ijk}$ of the $O_{ij}$ and a completion time $C_{i-1,j,k'}$ of the previous operation $O_{i-1,j}$, if $C_{i-1,j,k'}=S_{ijk}$, going to S4; otherwise going to S5;

S4, updating processing time, buffering time and blocking time, and judging whether the operation $O_{ij}$ is the last operation of the job; if so (i=$P_j$), going to S6; otherwise, returning to the S1 (i≠$P_j$);

S5, judging whether an output buffer corresponding to a machine $M_{k'}$ of the previous operation $O_{i-1,j}$ in a time period [$C_{i-1,j,k'}$, $S_{ijk}$] is available; if so, returning to the S4; otherwise going to S7;

S6, judging whether all the jobs have finished the decoding; if so, ending the decoding operation; otherwise, returning to the S1;

S7, judging whether other job processing has been scheduled on the machine $M_{k'}$ corresponding to the previous operation $O_{i-1,j}$ in the time period [$C_{i-1,j,k'}$, $S_{ijk}$] when the buffer is unavailable, if no other process has been scheduled, returning to the S4 ($l_{k'}>0$), otherwise going to S8;

S8, finding out a buffer available time moment of the machine $M_{k'}$ in the time period [$C_{i-1,j,k'}$, $S_{ijk}$], and judging whether there is other scheduled operation on the machine $M_{k'}$ from a completion of the previous operation to the buffer available time moment, and the buffer is available in a buffering time period from the buffer available time moment to a beginning of current operation; if there is no other scheduled operation in the blocking time period and the buffer is available in the buffering time period, returning to the S4; otherwise going to S9; and S9, adjusting the previous operation $O_{i-1,j}$ according to conflict points of the time period [$C_{i-1,j,k'}$, $S_{ijk}$] until there is no conflict between all decoded operations of the job; otherwise, returning to the S4.

Figure 3:
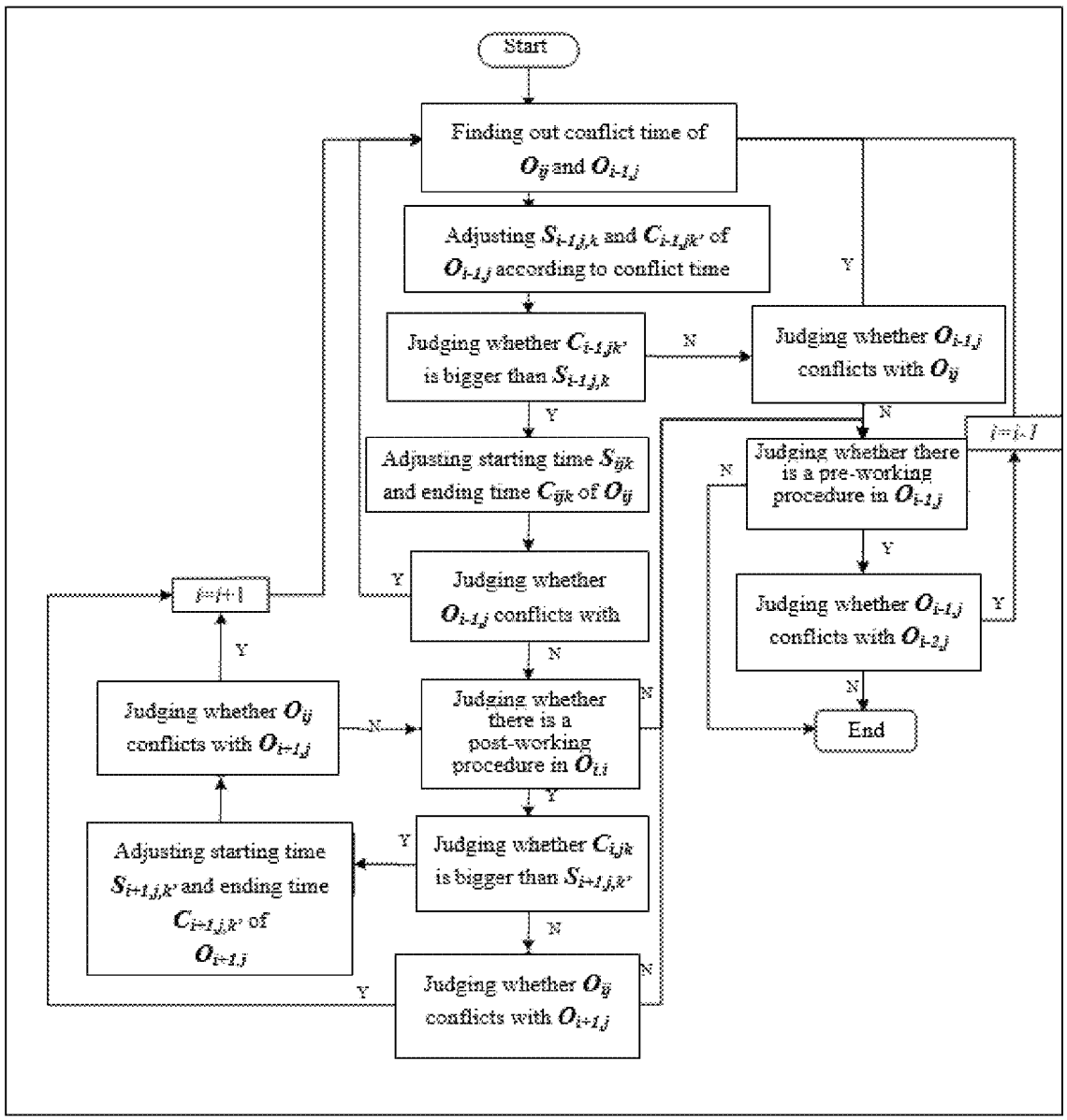
FIG. 3 is a flow chart of process conflict adjustment.

The flow chart of specific operation adjustment and conflict elimination in S9 is shown in FIG. 3, and the specific steps are as follows:

S91, finding out conflict points of the operation $O_{i-1,j}$ in the blocking time period or the buffering time period of the machine, and adjusting the earliest processing starting time and the completion time of the operation $O_{i-1,j}$ according to the conflict points;

S92, judging a relation between adjusted $C_{i-1,j,k'}$ and the processing starting time $S_{ijk}$ of $O_{ij}$; if $C_{i-1,j,k'}=S_{ijk}$, going to S93; if $C_{i-1,j,k'}<S_{ijk}$, going to S94; and if $C_{i-1,j,k'}>S_{ijk}$, going to S95;

S93, judging whether there is a previous operation before the operation $O_{i-1,j}$, and ending the adjusting if there is no previous operation; otherwise, going to S96;

S94, judging whether there is conflict between the operations $O_{ij}$ and $O_{i-1,j}$, and if there is conflict, returning to the S91 to continuously adjust $O_{i-1,j}$; otherwise, returning to the S93;

S95, re-adjusting the processing starting time $S_{ijk}$ of the operation $O_{ij}$ according to the adjusted $C_{i-1,j,k'}$; and then judging whether there is conflict between the operations $O_{ij}$ and $O_{i-1,j}$, if there is conflict, returning to the S91 to continuously adjust the operation $O_{i-1,j}$, otherwise, judging whether there is a decoded succeeding operation in the operation $O_{ij}$, and if there is decoded post-operation, going to S97, otherwise returning to the S93;

S96, judging whether there is conflict between the working processes $O_{i-2,j}$ and $O_{i-1,j}$, and if there is conflict, letting i=i−1 and returning to the S91, otherwise, ending the adjusting; and S97, judging whether there is conflict between the operations $O_{ij}$ and $O_{i+1,j}$, and if there is conflict, letting i=i+1 and returning to the S91, otherwise, returning to the S93.

Embodiments

According to the method, a standard benchmark example of the job shop is selected to test the performance of the algorithm. Based on the standard examples La01~La20, the percentage of buffer capacity of machines to the number of processed jobs is determined. For example, the scale of example La01 is 10×5, which means that the number of jobs is 10 and the number of machines is 5. When the percentage of machine buffer capacity to the number of machined jobs is 10%, it means that the buffer capacity of each machine is 1.

(1) Experimental Parameter Setting

The convergence of the IGA is affected by the initial population size, the probability of cross mutation and the number of iterations. In this paper, the population size is set at 50-200 and the number of iterations is 50-200 for comparison among different experiments and it turns out that the algorithm has better convergence when the population size PopSize=100 and the number of iterations Gmax=100. Specific parameter assignments of adaptive cross mutation parameters are shown in Table 1.

TABLE 1

IGA parameter table

| Parameter | Definition | Initial value |
|---|---|---|
| OPT | Generation gap | 0.9 |
| $P_{c1}$ | crossover probability | 0.9 |
| $P_{c2}$ | crossover probability | 0.6 |
| $P_{m1}$ | mutation probability | 0.1 |
| $P_{m2}$ | mutation probability | 0.01 |

(2) Analysis of Experimental Results

With the above method, the problematic model algorithm is realized by MATLAB R2014a software programming. The optimal solution obtained by running each example for 10 times under the same percentage of machine buffer capacity and job quantity is shown in Table 2.

TABLE 2

Completion time solving by IGA under different percentages of machine buffer capacity and job quantity

| | | Improved genetic algorithm Percentage of machine buffer capacity and job quantity | | | | | GAP |
|---|---|---|---|---|---|---|---|
| Example | Scale | 10 | 20 | 30 | 50 | BKS | (%) |
| La01 | 10 × 5 | 716 | 666 | 666 | 666 | 666 | 0 |
| La02 | 10 × 5 | 702 | 668 | 660 | 655 | 655 | 0 |
| La03 | 10 × 5 | 644 | 617 | 604 | 597 | 597 | 0 |
| La04 | 10 × 5 | 663 | 598 | 593 | 590 | 590 | 0 |
| La05 | 10 × 5 | 596 | 593 | 593 | 593 | 593 | 0 |
| La06 | 15 × 5 | 926 | 926 | 926 | 926 | 926 | 0 |
| La07 | 15 × 5 | 899 | 890 | 890 | 890 | 890 | 0 |
| La08 | 15 × 5 | 891 | 863 | 863 | 863 | 863 | 0 |
| La09 | 15 × 5 | 967 | 951 | 951 | 951 | 951 | 0 |
| La10 | 15 × 5 | 958 | 958 | 958 | 958 | 958 | 0 |
| La11 | 20 × 5 | 1270 | 1222 | 1222 | 1222 | 1222 | 0 |
| La12 | 20 × 5 | 1106 | 1039 | 1039 | 1039 | 1039 | 0 |
| La13 | 20 × 5 | 1210 | 1150 | 1150 | 1150 | 1150 | 0 |
| La14 | 20 × 5 | 1293 | 1292 | 1292 | 1292 | 1292 | 0 |
| La15 | 20 × 5 | 1302 | 1207 | 1207 | 1207 | 1207 | 0 |
| La16 | 10 × 10 | 982 | 978 | 946 | 946 | 945 | 0.11 |
| La17 | 10 × 10 | 810 | 789 | 785 | 785 | 784 | 0.13 |
| La18 | 10 × 10 | 903 | 861 | 857 | 857 | 848 | 1.06 |
| La19 | 10 × 10 | 874 | 860 | 858 | 858 | 842 | 1.90 |
| La20 | 10 × 10 | 942 | 918 | 911 | 907 | 902 | 0.55 |

Figure 4:
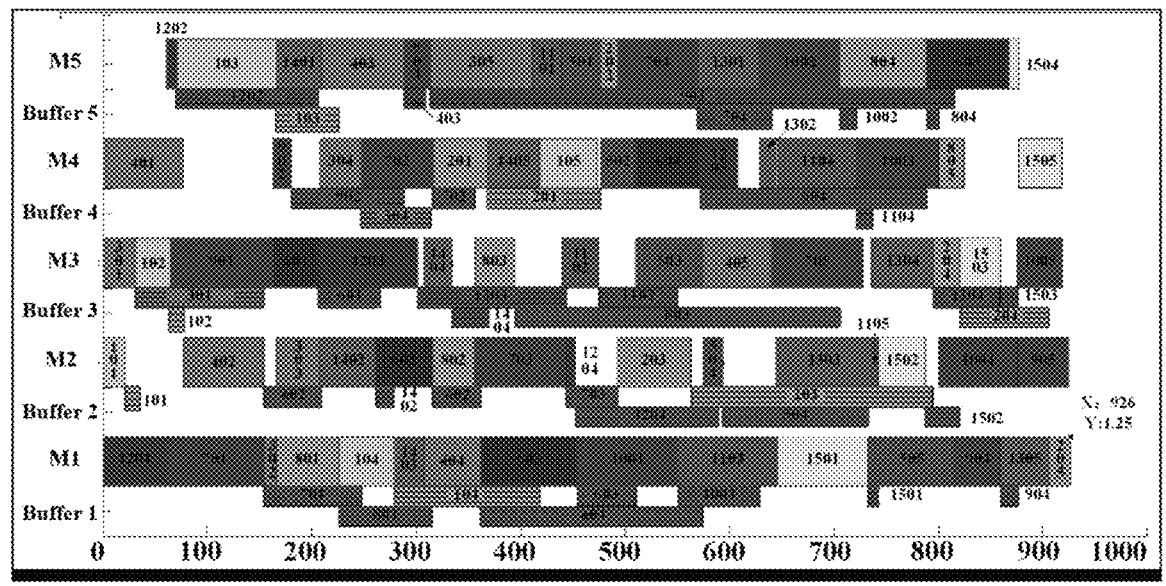
FIG. 4 is a gantt chart of scheduling results of LA06 according to an embodiment of the invention.
Figure 5:
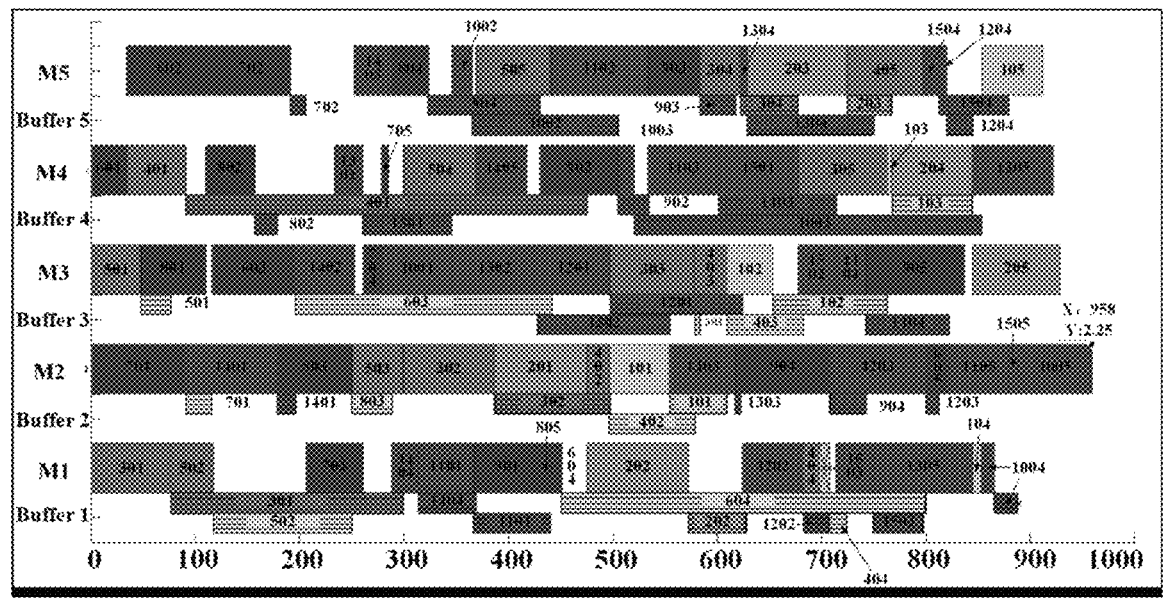
FIG. 5 is a gantt chart of scheduling results of LA10 according to an embodiment of the invention.

The percentage of GAP in Table 2 is the difference percentage between the optimal solution under the existing infinite buffer capacity when the ratio of machine buffer capacity to job quantity is 50%. It can be seen that for the classic JSP (Job shop scheduling problem), the IGA proposed in this paper can fulfil the existing optimal solution (BKS) under infinite buffer capacity even when the ratio of machine buffer capacity to job quantity is only 10%. For example, La06 and La10, and the gantt chart of scheduling results of La06 and La10 is shown in FIG. 4 and FIG. 5 respectively. Examples La02, La03 and La05~La15 can reach the existing optimal solution under infinite buffer capacity when the ratio of machine buffer capacity to job quantity reaches 20%, while La01~La15 can reach the existing optimal solution under infinite buffer capacity when the ratio of machine buffer capacity to job quantity reaches 50%. Although the complex large-scale examples La16~La20 does not reach the optimal solution under infinite buffer, the GAP between the complex large-scale examples La16~La20 and the optimal solution is also very small, which shows that the proposed IGA is effective for solving this problem.

In order to further analyze the superiority of the algorithm, the IGA is compared with other algorithms. The Neighbourhood Two Stage Algorithm (NTSA) is selected. Because there is no meta-heuristic algorithm for solving this problem at present, the genetic algorithm (GA) is used as the second comparative algorithm to solve the problem, and the optimal results of NTSA and GA are compared with that of IGA. There are few existing algorithms for solving this problem. Besides the above two comparative algorithms, the methods for solving the flow shop scheduling problem with buffer constraints are compared. Three algorithms (Immune Algorithm, Chaos and Harmony Search Algorithm, Differential Evolution Algorithm) are selected to calculate the completion time under different buffer capacity percentages, and the optimal results of the three algorithms are compared with those of the IGA. Results comparison is shown in Table 3, in which I-F denotes the difference percentage between the optimal values of IGA and three algorithms, I-N denotes the difference percentage between the optimal values of IGA and NTSA, and I-G represents the difference percentage between the optimal values of IGA and GA.

TABLE 3

Algorithm comparison table

Difference percentage (%) of completion time between improved genetic algorithm under the same percentage of the buffer capacity
Percentage of the machine buffer capacity and job quantity (%)

| | 10 | | | 20 | | | 30 | | | 50 | | |
|---|---|---|---|---|---|---|---|---|---|---|---|---|
| Example | I-F | I-N | I-G | I-F | I-N | I-G | I-F | I-N | I-G | I-F | I-N | I-G |
| La01 | −9.50 | −8.21 | −4.53 | −5.40 | 0 | 0 | −3.76 | 0 | 0 | −3.20 | 0 | 0 |
| La02 | −11.68 | −9.54 | −3.57 | −6.15 | −2.20 | −0.45 | −3.98 | −2.51 | −2.37 | −4.74 | −1.50 | −1.21 |
| La03 | −9.78 | −7.60 | −5.29 | −5.35 | 0 | −0.32 | −4.49 | −2.11 | −2.11 | −3.74 | −2.61 | −3.24 |
| La04 | −9.20 | −8.30 | −3.35 | −7.98 | −1.32 | −0.33 | −5.53 | −1.50 | −0.84 | −4.80 | −0.84 | −0.84 |
| La05 | −11.24 | −9.42 | −3.87 | −5.12 | 0 | 0 | −4.82 | 0 | 0 | −3.89 | 0 | 0 |
| La06 | −12.20 | −9.75 | −2.42 | −4.24 | 0 | 0 | −3.54 | 0 | 0 | −3.04 | 0 | 0 |
| La07 | −9.45 | −7.32 | −0.77 | −5.42 | −0.34 | 0 | −3.78 | 0 | 0 | −3.58 | 0 | 0 |
| La08 | −10.77 | −8.71 | −3.26 | −7.80 | −1.93 | 0 | −6.30 | −1.26 | 0 | −5.27 | 0 | 0 |
| La09 | −10.03 | −8.77 | −3.59 | −6.95 | 0 | 0 | −3.35 | 0 | 0 | −2.26 | 0 | 0 |
| La10 | −8.46 | −7.26 | 0 | −5.89 | 0 | 0 | −2.94 | 0 | 0 | −2.44 | 0 | 0 |
| La11 | −4.57 | −3.64 | −3.57 | −5.56 | 0 | 0 | −4.68 | 0 | 0 | −3.70 | 0 | 0 |
| La12 | −10.40 | −8.22 | −1.43 | −9.18 | −0.10 | 0 | −4.85 | 0 | 0 | −3.17 | 0 | 0 |
| La13 | −10.33 | −8.82 | −4.72 | −9.52 | 0 | 0 | −6.88 | 0 | 0 | −5.81 | 0 | 0 |
| La14 | −8.35 | −7.05 | −0.69 | −6.65 | 0 | 0 | −4.93 | 0 | 0 | −4.58 | 0 | 0 |

TABLE 3-continued

Algorithm comparison table

Difference percentage (%) of completion time between improved genetic algorithm under the same percentage of the buffer capacity
Percentage of the machine buffer capacity and job quantity (%)

| | 10 | | | 20 | | | 30 | | | 50 | | |
|---|---|---|---|---|---|---|---|---|---|---|---|---|
| Example | I-F | I-N | I-G | I-F | I-N | I-G | I-F | I-N | I-G | I-F | I-N | I-G |
| La15 | −9.68 | −7.92 | −2.69 | −9.01 | −1.79 | −1.23 | −5.85 | −1.23 | 0 | −5.11 | 0 | 0 |
| La16 | −16.40 | −12.94 | −2.58 | −9.66 | −0.10 | −0.41 | −5.32 | −2.67 | −3.37 | −5.19 | −2.27 | −2.17 |
| La17 | −18.15 | −13.92 | −2.64 | −11.39 | −2.11 | −1.50 | −8.86 | −2.24 | −0.88 | −8.91 | −1.26 | −0.25 |
| La18 | −13.40 | −10.51 | −1.42 | −10.29 | −1.71 | −1.26 | −9.75 | −1.38 | −0.46 | −7.95 | −0.35 | −0.15 |
| La19 | −15.90 | −12.16 | −4.38 | −10.44 | −1.94 | −1.71 | −8.07 | −1.49 | −0.92 | −7.58 | −0.92 | −0.92 |
| La20 | −9.66 | −11.63 | −2.38 | −9.10 | −0.33 | −2.24 | −6.94 | −0.11 | −1.51 | −7.61 | −1.09 | −0.44 |

It can be seen from Table 3 that compared with other algorithms, the IGA can reduce the completion time under the same buffer capacity percentage, and when the percentage of buffer capacity and job quantity is 10%, 20%, 30% and 50%, compared with other three algorithms in the flow shop scheduling problem with buffer constraints, the average difference percentage among the optimal values of IGA is reduced by 10.96%, 7.55%, 5.43% and 4.83% respectively; compared with NATA, IGA reduces by 9.08%, 0.69%, 0.62% and 0.46% respectively, and IGA reduces by 2.86%, 0.47%, 0.62% and 0.46% respectively compared with GA. Obviously, the IGA is superior to the contrast algorithm.

In order to verify the stability of the IGA, each example is run for 10 times under different percentage of machine buffer capacity and job quantity, and then the difference percentage between the average and the optimal solution under infinite buffer capacity is calculated; finally, the difference percentage under the same example scale is averaged, and the results are shown in Table 4.

TABLE 4

Comparison of deviations

| | | Percentage of machine buffer capacity and job quantity | | | |
|---|---|---|---|---|---|
| Example | Scale | 10 | 20 | 30 | 50 |
| La01~La05 | 10 × 5 | 9.62% | 2.93% | 2.48% | 1.85% |
| La06~La10 | 15 × 5 | 3.32% | 0.28% | 0.13% | 0.02% |
| La11~La15 | 20 × 5 | 8.61% | 0.54% | 0.08% | 0.05% |
| La16~La20 | 10 × 10 | 7.64% | 5.00% | 4.48% | 4.00% |

It can be seen from the table that the difference between the scheduling result under increased percentage of the machine buffer capacity to job quantity and the scheduling result under unlimited buffer capacity will become smaller and smaller. Especially when the percentage of the machine buffer capacity to job quantity reaches 20%, the deviation will decrease rapidly.

What is claimed is:

1. A job shop scheduling method with buffer constraint based on an improved genetic algorithm (IGA), comprising:
step 1, establishing a job shop scheduling mathematical model with buffer constraints;
wherein the step 1 specifically comprises: assuming that there are n independent and non-preemptive jobs that must be processed on m machines, and establishing an objective mathematical model expressed as the following formula (1) by minimizing a completion time as an optimization objective:

$$\min C = \min\left(\max_{1 \le j \le n}(C_j)\right) \quad (1)$$

where C denotes a maximum completion time of jobs, $C_j$ denotes a completion time of job j, j denotes a job index, and n denotes number of the jobs;
wherein constraint conditions are expressed as follows:

$$P_{ijk} > 0, i=1,2,\ldots,p_j; j=1,2,\ldots,n; k=1,2,\ldots,m \quad (2)$$

where formula (2) indicates that a non-negative constrain on a processing time of each operation of the job, $P_{ijk}$ is the processing time of an i-th operation of the job j on a machine $M_k$, m denotes the number of machines, k denotes a machine index, M denotes a machine set, $M_k$ denotes a machine k, $M_k \in M$, $P_j$ denotes an operation number of the job j, and i denotes an operation index of the job j on a designated processing route;

$$\sum_{k=1}^{m} h_{ijk} C_{ijk} \le \sum_{k=1}^{m} h_{(i+1)jk} S_{(i+1)jk}; \quad (3)$$

$$i = 1, 2, \ldots, p_i; j = 1, 2, \ldots, n$$

where formula (3) indicates that there is no priority relationship between operations of different ones of the jobs, and the same job meets process relations between operations; $h_{ijk}$ denotes whether the i-th operation of the job j is on the machine $M_k$, if so, $h_{ijk}=1$, otherwise, $h_{ijk}=0$; $S_{ijk}$ denotes a processing starting time of the i-th operation of the job j on the machine $M_k$;

$$\sum_{k=1}^{m} h_{ijk} = 1, \quad i = 1, 2, \ldots, p_i; j = 1, 2, \ldots, n \quad (4)$$

where formula (4) indicates that the job can only be processed on one machine at one time;

$$\sum_{j=1}^{n} h_{ijk} \le 1, \quad i = 1, 2, \ldots, p_i; k = 1, 2, \ldots, m \quad (5)$$

where formula (5) indicates that one machine can only process one job at one time;

$$\sum_{k=1}^{m} \beta_{ijk} h_{ijk}(S_{ijk} + P_{ijk} + B_{ijk} + ST_{ijk}) = \sum_{k=1}^{m} h_{(i+1)jk} S_{(i+1)jk}, \quad (6)$$

$$i = 1, 2, \ldots, p_i - 1; j = 1, 2, \ldots, n$$

where equation (6) indicates a constraint of limited buffer excluding a last operation in a processing route of each job, and the job is considered as leaving a production system and no longer occupying resources when the last operation of the job is completed; after the i-th operation $O_{ij}$ of the job j is completed, a departure time of the job j in a corresponding buffer of the machine is the same as a starting time of a next operation $O_{i+1,j}$ of the job j; $\beta_{ijk}$ denotes whether the $O_{ij}$ needs to enter the corresponding buffer after being completed on the machine $M_k$, if so, $\beta_{ijk}=1$, otherwise, $\beta_{ijk}=0$; $B_{ijk}$ denotes a blocking time of the job j on the machine $M_k$ after the i-th operation is completed, and $ST_{ijk}$ denotes a storage time of the job j in the machine after the i-th operation is completed;

$$\sum_{k=1}^{m} \alpha_k h_{ijk}(S_{ijk} + P_{ijk} + B_{ijk}) = \sum_{k=1}^{m} h_{(i+1)jk} S_{(i+1)jk}, \quad (7)$$

$$i = 1, 2, \ldots, p_{i_1}; j = 1, 2, \ldots, n$$

where equation (7) indicates a blocking constraint excluding the last operation in the processing route of each job, and the machine is blocked if a buffer capacity is insufficient; after a completion of $O_{ij}$, the machine $M_k$ is possibly blocked because the corresponding buffer is full; $\alpha_k$ denotes whether the buffer capacity corresponding to the machine $M_k$ is sufficient, and if the buffer capacity is insufficient, $\alpha_k=1$, otherwise, $\alpha_k=0$; and step 2, performing an optimization solution of the improved genetic algorithm for the non-preemptive jobs, which specifically comprises the following sub-steps:

sub-step (1), parameters initialization, which specifically comprises: setting a population size PopSize, a generation gap OPT, crossover probabilities $P_{c1}$ and $P_{c2}$, mutation probabilities $P_{m1}$ and $P_{m2}$, and maximum iteration times Gmax;

sub-step (2), population initialization, which specifically comprises: using real-number coding to randomly generate an operation sequence to thereby generate an initial population Initial_Pop;

sub-step (3), population fitness function value calculation, which specifically comprises: calculating objective function values according to the formula (1) and then converting the objective function values into fitness values;

sub-step (4), selection operation, which specifically comprises: selecting individuals of the population according to the fitness values and the generation gap OPT by means of a roulette;

sub-step (5), crossover operation, which specifically comprises: combining an improved variety crossover and an integer crossover according to the population after the selection operation, and determining whether crossover is needed according to the fitness values of the individuals and the following formula (8), wherein the improved variety crossover refers to the crossover operation between elite individuals of the population and some individuals with poor fitness values after the selection operation; after the selection operation, performing a shuffle crossover on the rest of individuals except for individuals undergoing the improved variety crossover;

$$P_c = \begin{cases} P_{C1} - \dfrac{(P_{c1} - P_{c2})(f' - f_{avg})}{f_{max} - f_{avg}}, & f' \geq f_{avg} \\ P_{C1}, & f' < f_{avg} \end{cases} \quad (8)$$

where $f_{max}$ denotes a maximum fitness value of individual in the population, $f_{avg}$ denotes an average fitness value of the population, f' denotes a larger fitness value of two crossed individuals, and $P_{c1}$ and $P_{c2}$ denote maximum and minimum crossover probabilities respectively;

sub-step (6), mutation operation, which specifically comprises: adopting a two-point mutation according to the fitness values of the individuals and the following formula (9) to randomly exchange operation positions of two different jobs for mutation;

$$P_m = \begin{cases} P_{m1} - \dfrac{(P_{m1} - P_{m2})(f_{max} - f)}{f_{max} - f_{avg}}, & f \geq f_{avg} \\ P_{m1}, & f < f_{avg} \end{cases} \quad (9)$$

where $P_{m1}$ and $P_{m2}$ denote maximum and minimum mutation probabilities respectively, and f denotes a fitness value of mutated individual;

sub-step (7), population merging, which specifically comprises: maintaining top 10% of elite individuals according to fitness values of parents and offsprings by adopting an elite retention strategy, and replacing remaining individuals in parents with individuals after genetic operations; and sub-step (8), judging whether the maximum iteration times is met, wherein a result is output when the maximum iteration times is met, or returning to the sub-step (2) when the maximum iteration times is not met; and step 3, scheduling the non-preemptive jobs based on the optimization solution of the improved genetic algorithm.

2. The job shop scheduling method according to claim 1, wherein a decoding operation is required in the sub-step (3), and which comprises the following specific steps:

S1, decoding according to the operation sequence, and finding out earliest processing starting time $S_{ijk}$ of currently decoded $O_{ij}$ on the machine $M_k$;

S2, when $O_{ij}$ is first operation of the job j, namely i=1, returning to the S1 to continue decoding the next operation; otherwise, going to S3;

S3, judging according to the processing starting time $S_{ijk}$ of the $O_{ij}$ and a completion time $C_{i-1,j,k'}$ of the previous operation $O_{i-1,j}$, if $C_{i-1,j,k'}=S_{ijk}$, going to S4; otherwise going to S5;

S4, updating processing time, buffering time and blocking time of the machine, and judging whether the operation $O_{ij}$ is the last operation of the job, if so, going to S6; otherwise, returning to the S1;

S5, judging whether an output buffer corresponding to a machine $M_{k'}$ of the previous operation $O_{i-1, j}$ in a time period $[C_{i-1,j,k'}, S_{ijk}]$ is available; if so, returning to the S4; otherwise going to S7;

S6, judging whether all the jobs have finished the decoding; if so, ending the decoding operation; otherwise returning to the S1;

S7, judging whether other job processing has been scheduled on the machine $M_{k'}$ corresponding to the previous operation $O_{i-1, j}$ in the time period $[C_{i-1,j,k'}, S_{ijk}]$ when the buffer is unavailable, if no other job processing has been scheduled, returning to the S4, otherwise going to S8;

S8, finding out a buffer available time moment of the machine $M_{k'}$ in the time period $[C_{i-1,j,k'}, S_{ijk}]$, and judging whether there is other scheduled operation on the machine $M_{k'}$ in a blocking time period from a completion of the previous operation to the buffer available time moment, and the buffer is available in a buffering time period from the buffer available time moment to a beginning of current operation; if there is no other scheduled operation in the blocking time period and the buffer is available in the buffering time period, returning to the S4; otherwise going to S9; and S9, adjusting the previous operation $O_{i-1,j}$ according to conflict points of the time period $[C_{i-1,j,k'}, S_{ijk}]$ until there is no conflict between all decoded operations of the job; otherwise, returning to the S4.

3. The job shop scheduling method according to claim 2, wherein the S9 specifically comprises:

S91, finding out conflict points of the operation $O_{i-1,j}$ in the blocking time period or the buffering time period of the machine, and adjusting the earliest processing starting time and the completion time of the operation $O_{i-1,j}$ according to the conflict points;

S92, judging a relation between adjusted $C_{i-1,j,k'}$ and the processing starting time $S_{ijk}$ of $O_{ij}$; if $C_{i-1, j, k'}=S_{ijk}$, going to S93; if $C_{i-1,j,k'}<S_{ijk}$, going to S94; and if $C_{i-1,j,k'}>S_{ijk}$, going to S95;

S93, judging whether there is a previous operation before the operation $O_{i-1,j}$, and ending the adjusting if there is no previous operation; otherwise, going to S96;

S94, judging whether there is conflict between the operations $O_{ij}$ and $O_{i-1,j}$, and if there is conflict, returning to the S91 to continuously adjust $O_{i-1,j}$; otherwise, returning to the S93;

S95, re-adjusting the processing starting time $S_{ijk}$ of the operation $O_{ij}$ according to the adjusted $C_{i-1,j,k'}$; and then judging whether there is conflict between the operations $O_{ij}$ and $O_{i-1,j}$, if there is conflict, returning to the S91 to continuously adjust the operation $O_{i-1,j}$, otherwise, judging whether there is a decoded succeeding operation in the operation $O_{ij}$; and if there is decoded succeeding operation, going to S97, otherwise returning to the S93;

S96, judging whether there is conflict between operations $O_{i-2,j}$ and $O_{i-1,j}$, and if there is conflict, letting i=i-1 and returning to the S91, otherwise ending the adjusting; and S97, judging whether there is conflict between the working procedures $O_{ij}$ and $O_{i+1,j}$, and if there is conflict, letting i=i+1 and returning to the S91, otherwise going to the S93.

* * * * *